US005180138A

United States Patent [19]

Moldenhauer

[11] Patent Number: 5,180,138

[45] Date of Patent: Jan. 19, 1993

[54] SOLENOID CONTROLLED SERVO VALVE

[75] Inventor: Hermann Moldenhauer, Düsseldorf, Fed. Rep. of Germany

[73] Assignee: Firma A.U.K. Muller GmbH & Co. KG, Dusseldorf, Fed. Rep. of Germany

[21] Appl. No.: 831,136

[22] Filed: Feb. 4, 1992

[30] Foreign Application Priority Data

Feb. 8, 1991 [DE] Fed. Rep. of Germany ....... 4103777

[51] Int. Cl.[5] .............................................. F16K 31/12

[52] U.S. Cl. .................................. 251/30.05; 251/45; 251/129.15

[58] Field of Search ............... 251/30.02, 30.03, 30.04, 251/30.05, 129.15, 45

[56] References Cited

U.S. PATENT DOCUMENTS 3,424,426 1/1969 Neff ................................ 251/30.03
4,967,996 11/1990 Sonada ............................ 251/30.02

FOREIGN PATENT DOCUMENTS 3822830 1/1990 Fed. Rep. of Germany .

*Primary Examiner*—Robert G. Nilson
*Attorney, Agent, or Firm*—Sprung Horn Kramer & Woods

[57] ABSTRACT

A servo valve controlled by a bistable solenoid valve and activated by the same fluid—liquid or gas—it controls the flow of. A disk is mounted on a differential piston that travels back and forth in the housing. A compression chamber at one end of the piston communicates with a fluid intake and, by way of a seat facing the disk, with a fluid outlet. The piston has an eccentric control bore extending through it. A control chamber at the other end of the piston communicates with the fluid outlet through a depressurization channel and with the compression chamber through the control bore. The solenoid valve has a chamber and seat and an armature that travels back and forth in a tube. The tube extends through a coil on the housing. A gasket is mounted on the end of the armature facing the solenoid valve's seat. The other end faces a head accommodated in the tube. A yoke surrounds both ends of the coil. The depressurization channel extends through the chamber and seat and can be closed off by the plug. The armature, head, and yoke are made of soft-magnetic material. The opening pulse magnetizes the head and attracts the armature, opening the solenoid valve. The closing pulse demagnetizes the head, and the armature drops under its own weight and closes the solenoid valve. The device can be operated at approximately 10 mWsec a cycle.

8 Claims, 3 Drawing Sheets

SOLENOID CONTROLLED SERVO VALVE

BACKGROUND OF THE INVENTION

The invention concerns a servo valve controlled by a bistable solenoid valve and activated by the same fluid—liquid or gas—it controls the flow of. A disk is mounted on a differential piston that travels back and forth in the housing. A compression chamber at one end of the piston communicates with a fluid intake and, by way of a seat facing the disk, with a fluid outlet. The piston has an eccentric control bore extending through it. A control chamber at the other end of the piston communicates with the fluid outlet through a depressurization channel and with the compression chamber through the control bore. The solenoid valve has a chamber and seat and an armature that travels back and forth in a tube. The tube extends through a coil on the housing. A gasket is mounted on the end of the armature facing the solenoid valve's seat. The other end faces a head accommodated in the tube. A yoke surrounds both ends of the coil. The depressurization channel extends through the chamber and seat and can be closed off by the plug.

A valve of this type is known. It is described in German 0S 3 822 830 for example. Many embodiments of bistable solenoid valves for servo controlling are known. They make it possible to operate with the least possible power. Another advantage is direct control at the interface without signal processing. A third is that the coil and armature will not heat up. Bistability can usually be attained with a permanent magnet and a matching spring. Solenoid valves without permanent magnets are also known, however. Their bistability derives from their relatively hard-magnetic materials. The coercive field strength of such materials can be either decreased to zero or augmented for a brief period that depends on the polarity of the coil, and the solenoid valve's armature will be either attracted by the polar surface or unattracted and repelled by a compensating spring. Without a permanent magnet, a solenoid valve cannot act as a trap for any iron-containing particles floating in a hydraulic fluid.

SUMMARY OF THE INVENTION

The object of the present invention is an improvement in the servo valve described above, comprising such an even greater decrease in the consumption of electricity that the controls can be operated with a battery, with the design remaining of the utmost simplicity.

This object is attained in accordance with the invention in that the armature travels freely back and forth in the tube, in that the head, the armature, and the yoke are all made of soft-magnetic material, and in that the weight of the armature equals the force that retains it in position, which is dictated by the coercive field strength or force of the soft-magnetic material.

The theory behind the invention is to use soft-magnetic materials (or low retentivity) for the magnetics of the bistable solenoid valve because, due to their low coercive field strengths, the materials' polarity can be reversed with very little electricity, whereas the armature cannot be retained at the pole against the force of a compensating spring at such a slight coercive field strength. The compensating spring is accordingly completely eliminated and the armature's weight adapted to the force of retention to the extent that, when a solenoid valve-closing pulse decreases the coercive field strength to zero, it will fall of its own weight. The result is that, although the overall length of such a solenoid valve is limited, such an equivalence of weight to retaining force can be attained that the device can be installed with its longitudinal axis at an angle of up to 30° to the vertical.

The invention also concerns how a servo valve in accordance with the invention can be operated with pulses that control the opening and closing of the solenoid valve or by electric controls that generate the pulses and that the solenoid valve is connected to.

The voltages of the opening pulses and closing pulses that turn the servo valve off and on must be at a prescribed ratio to each other to prevent the system from remagnetizing once the armature has been released by a closing pulse, which would lead to the armature retracting. Ratios of essentially 3:1 to 5:1 have been proven of advantage. Turning the solenoid valve off will accordingly take only ⅓ to 1/5 of the power needed to attract the armature. This mode of operation is also of particular value from the safety aspect in the event that the solenoid valve must close automatically during a power failure, even during the opening phase.

The invention accordingly also provides that, whenever an opening pulse is released, the controls that control the solenoid valve will extract from the power source and will store enough electricity to generate a closing pulse. The advantage of this feature is that a closing pulse can be emitted even in the event of power failure or battery exhaustion. The relationship between opening pulses and closing pulses will also prevent the solenoid valve from being turned on when there is not enough power left in the battery to turn it off.

It has been demonstrated that the servo valve in accordance with the invention can be operated over one control cycle at the extraordinarily low consumption of 10 mWsec (milliwatt seconds) at 6 bars of fluid pressure for example. This level of consumption is approximately 70% below that of the known bistable solenoid valve described in German OS 3 822 830.

One embodiment of a servo valve in accordance with the invention will now be described with reference to the accompanying drawings.

BRIEF DESCRIPTION OF THE DRAWINGS

FIG. 1 is a section through a servo valve controlled by a bistable solenoid valve and activated by the same fluid—liquid or gas—it controls the flow of.

DETAILED DESCRIPTION OF THE INVENTION

Figure 1:
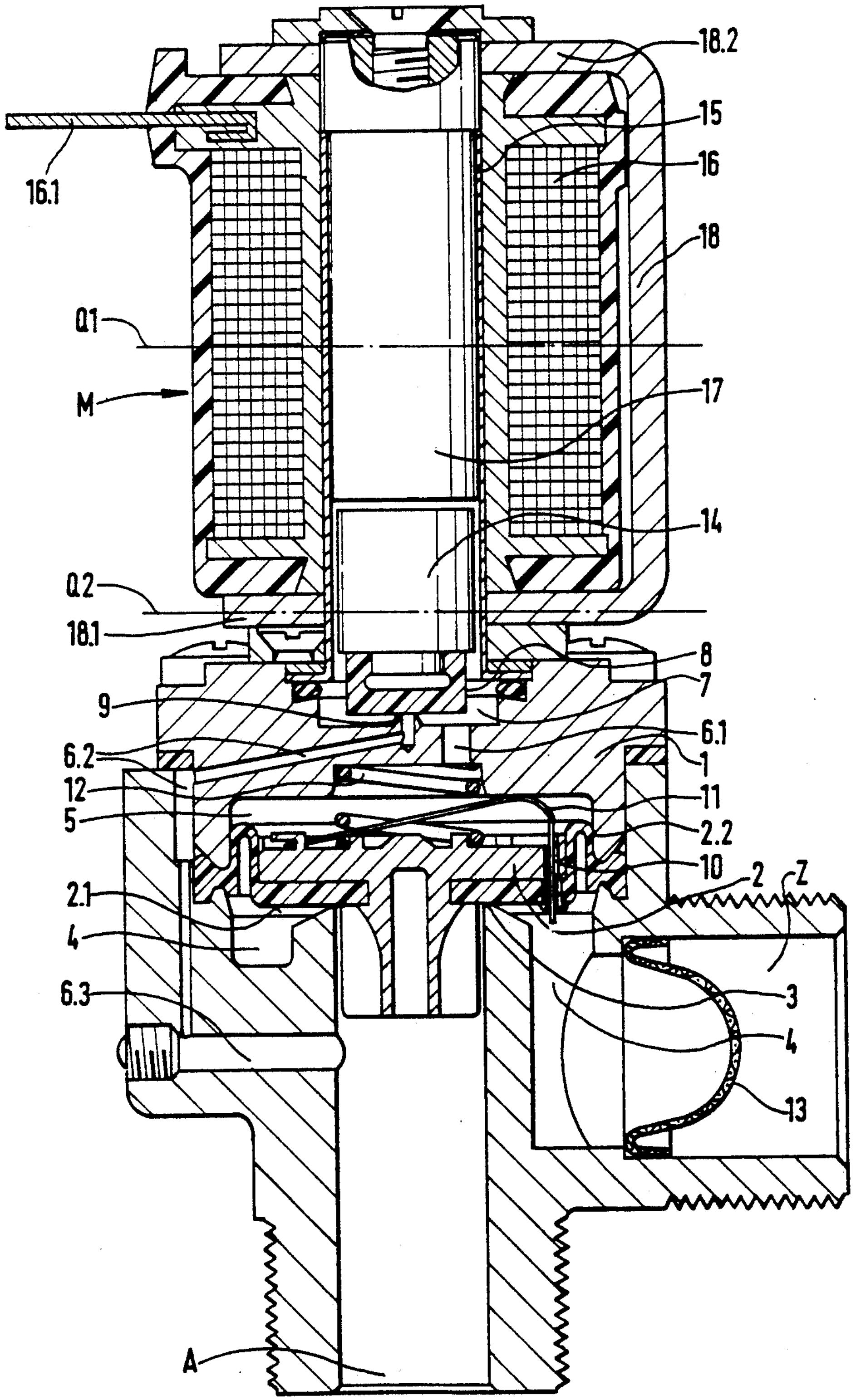

The valve illustrated in FIG. 1 has a housing 1 with a fluid intake Z and a fluid outlet A. A filter 13 is accommodated in the intake. A differential piston 2 travels back and forth in housing 1. The piston is sealed off against the housing by a cuff 2.2. A disk 2.1 is mounted on one end of piston 2. The disk faces a seat 3. Fluid intake Z, which is the source of pressure, opens into an annular compression chamber 4 that communicates with fluid outlet A by way of seat 3.

Positioned at the end of piston 2 averted from seat 3 is a control chamber 5. Chamber 5 is demarcated by piston 2 and cuff 2.2. Control chamber 5 communicates with compression chamber 4 by way of a control bore 10. Bore 10 extends eccentrically through piston 2. Also accommodated in control chamber 5 are a wire 11 and a spring 12. Wire 11 extends into compression chamber 4 through control bore 10 and keeps the bore unclogged through a procedure that is in itself known. Spring 12 returns the piston when control chamber 5 depressurizes.

Control chamber 5 communicates with fluid outlet A through a decompression channel consisting of sections 6.1, 6.2, and 6.3. Section 6.1 also connects pressure chamber 5 with a solenoid valve chamber 7. Solenoid valve chamber 7 communicates with fluid outlet A by way of a solenoid valve seat 9 and of sections 6.2 and 6.3 of the decompression channel. Solenoid valve chamber 7 is accommodated in housing 1. Solenoid valve chamber 7 and solenoid valve seat 9 are part of a bistable solenoid valve M that is illustrated in its entirety in FIG. 1. The solenoid valve is mounted on housing 1 essentially coaxial with piston 2.

Bistable solenoid valve M has a coil 16. A tube 15 extends through the coil. An armature 14 travels back and forth in the tube. A gasket 8 is mounted on the end of the armature that faces housing 1. The gasket faces a seat 9. The other end of armature 14 faces a head 17. The head is secured tight inside tube 15. Coil 16 is surrounded by a yoke 18. One end 18.1 of the yoke encloses the end of coil 16 at the bottom in FIG. 1 and extends between coil 16 and housing 1. The other end 18.2 of yoke 18 encloses the top of coil 16.

Armature 14, head 17, and yoke 18 are made of a soft-magnetic material with a coercive field strength of less than 400 A/m (tempere turns per meter). The coercive field strength of 18 can be somewhat higher than that of the armature and head. As will be evident from FIG. 1, armature 14 is much shorter than conventional solenoid valves, and the air gap between armature 14 and head 17, which would ordinarily be at the same level as the transverse plane half-way up the coil, is very definitely below the level of halfway-up transverse plane Q1 through coil 16. Furthermore, the halfway-up transverse plane Q2 through armature 14 is at approximately the same level as the bottom 18.1 of yoke 18. The weight of armature 14 matches the magnetic retaining force closely enough to ensure that, once an opening pulse has been introduced through coil input terminal 16.1 and magnetized coil 16, the very light-weight armature 14 will be retained in position by the coercive field strength at head 17. In this state, bistable solenoid valve M will be open, with gasket 8 off seat 9. The servo valve will now begin to operate conventionally. With decompression channel 6.1, 6.2, and 6.3 open, the pressure in control chamber 5 will be the same as that in fluid outlet A, and the pressure in compression chamber 4 will lift piston 2 off seat 3, opening the valve.

When a closing pulse is supplied to coil 16, reversing the polarity of the magnetic field, eliminating the coercive field strength, and decreasing the retaining force to zero, armature 14 will drop under its own weight from head 17. Gasket 8 will close off seat 9 and hence decompression channel 6.1, 6.2, and 6.3. The compressed fluid entering through fluid intake Z will enter control chamber 5 by way of compression chamber 4 and control bore 10. The various surfaces on piston 2 are dimensioned to ensure that, with the decompression channel closed, the fluid will force the piston toward seat 3 and, as disk 2.1 comes to rest against the seat, close the valve.

The pulses that reverse the magnetization can be generated in various ways. Controls that are not specifically illustrated can for example generate pulses of the same amplitude and polarity and coil 16 can have two windings of opposite direction and different electric resistance so that the current accompanying an opening pulse will differ from that accompanying a closing pulse and generate a magnetic field of the opposite polarity.

It is on the other hand also possible to generate pulses that differ in amplitude and polarity right from the start and for coil 16 to have only one winding.

Figure 2:
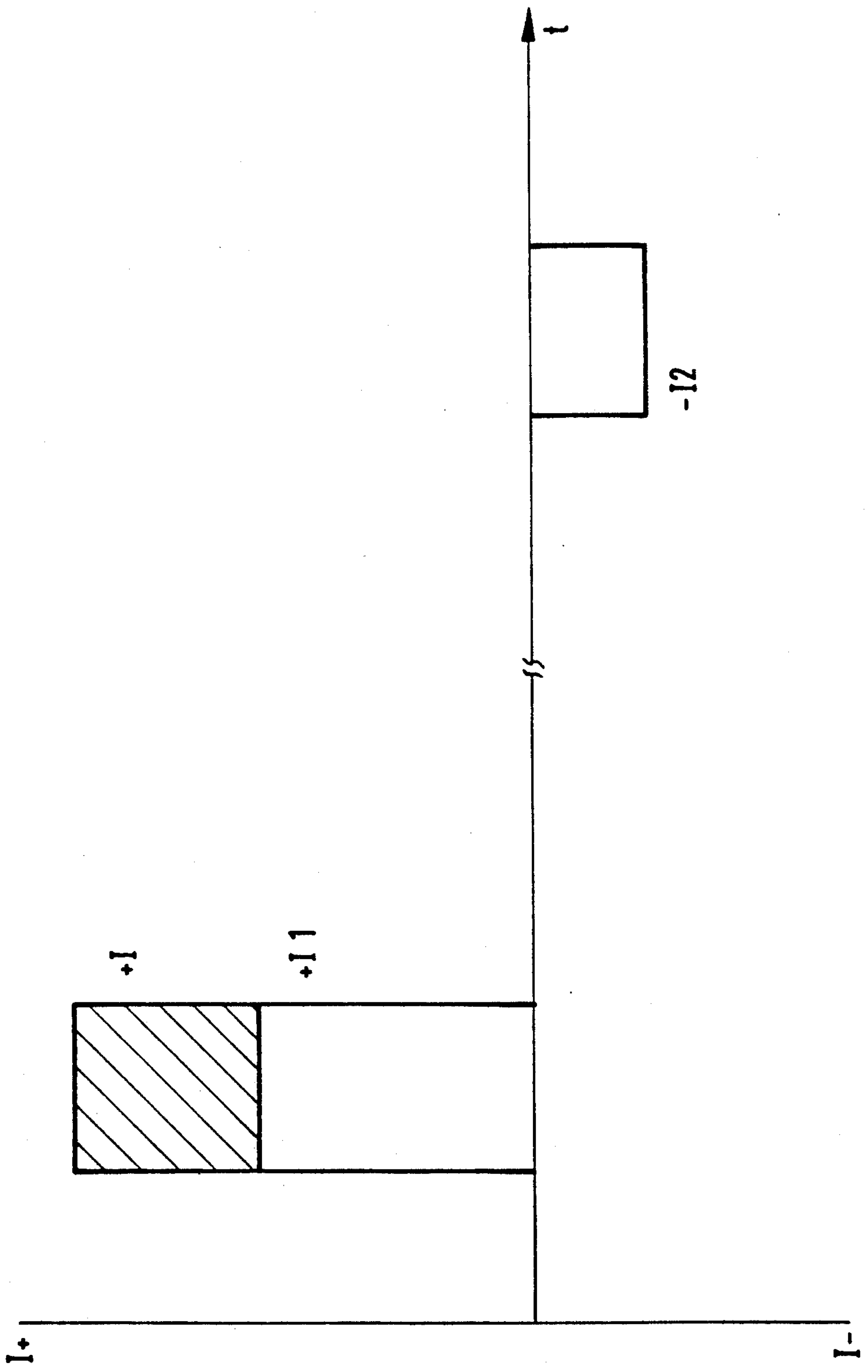
FIG. 2 is a graph of opening pulses and closing pulses in terms of current over time.

FIG. 2 schematically illustrates an opening pulse I1 and a closing pulse −I2 in the form of current pulses over time t. Their output ratio ranges from 3:1 to 5:1. This ratio prevents closing pulse −I2 from remagnetizing head 17 such that armature 14 would become attractive and open the valve again. The hatched area of the opening pulse illustrated in FIG. 2 indicates a component that charges a buffer capacitor C1 in the circuitry that will now be specified, ensuring that a closing pulse can be generated even in the absence of power.

Figure 3:
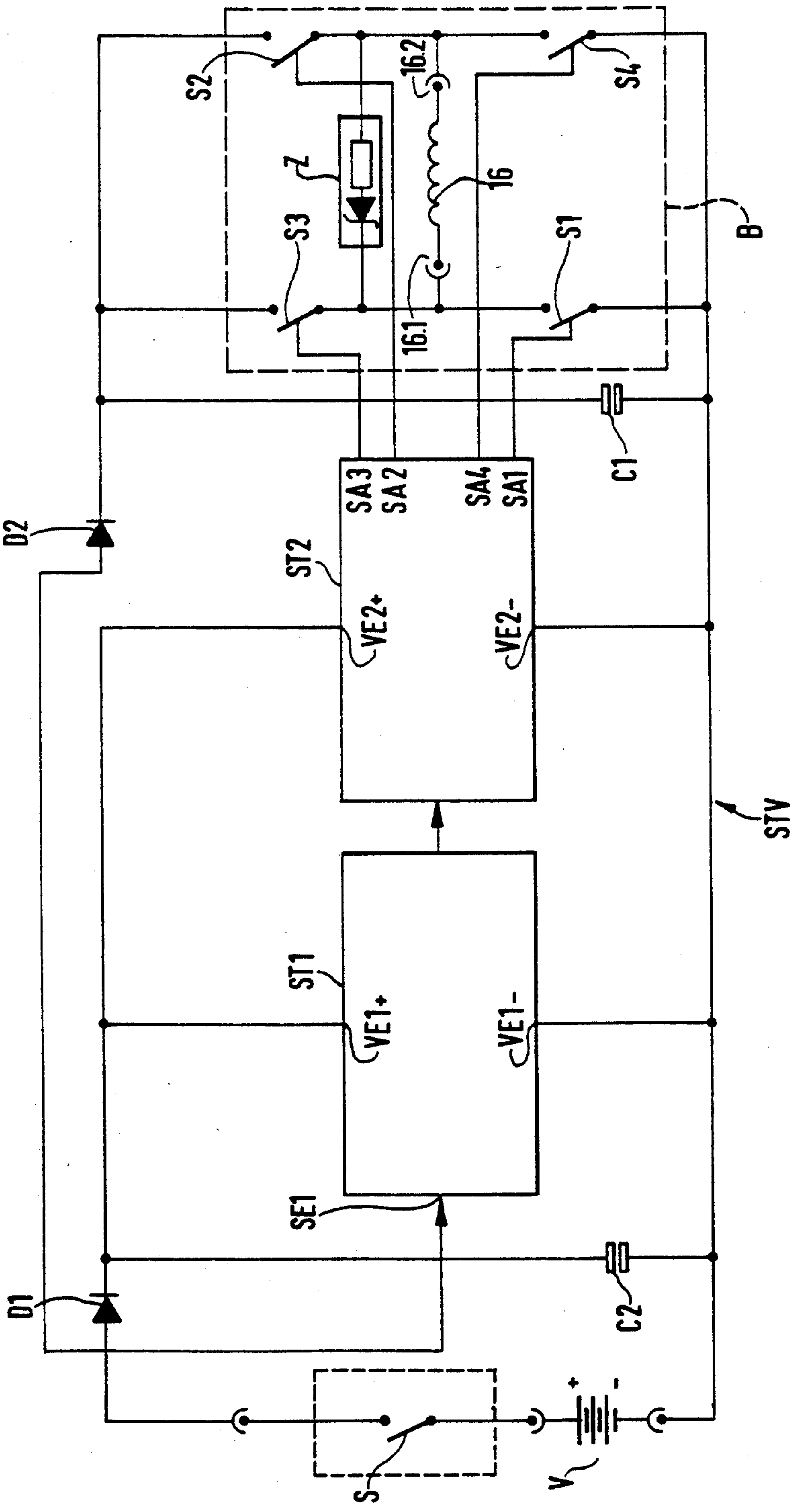
FIG. 3 is a diagram illustrating the circuitry that turns the solenoid valve controlling the servo valve illustrated in FIG. 1 on and off.

FIG. 3 is a schematic representation of controls STV that generate opening pulses and closing pulses. The controls communicate by way of a switch S with a source V of electric power in the form of a battery for example. Switch S can be a proximity switch and can in that event be triggered by infrared radiation, ultrasound, radar, etc. Source V supplies power by way of input terminals VE1+ and VE1− to a component ST1 of controls STV that monitors the voltage and by way of input terminals VE2+ and VE2− to another component ST2 of the controls STV that generates the pulses. When switch S is closed, a signal is forwarded to the signal-input terminal SE1 of controls component ST1. A buffer capacitor C2 that will ensure the continued presence of sufficient power when switch S is opened is simultaneously charged. A diode D1 prevents the capacitor from discharging backward.

Also communicating with power source V by way of switch S is a bridge circuit B that includes four switching components S1, S2, S3, and S4. Their activating input terminals each communicate with and receive signals from the signal-emitting output terminals SA1, SA2, SA3, and SA4 of second controls component ST2. Switching components S1, S2, S3, and S4 are represented in FIG. 3 as switches. They could of course be electronic switching components like transistors or integrated circuits instead. One branch of bridge circuit B accommodates magnetic coil 16 with its input terminals 16.1 and 16.2. Paralleling coil 16 is a voltage-limiting circuit Z that demarcates the height of the closing pulses. Paralleling bridge circuit B is another buffer capacitor Cl, which generates a closing pulse in the absence of power. A diode D2 prevents the capacitor from discharging backward.

How the circuitry operates will now be described.

When switch S is closed, controls component ST2 emits a signal from signal-emitting output terminals SA1 and SA2 that briefly closes switching components S1 and S2, connecting the input terminal 16.1 of coil 16 to the negative pole and its input terminal 16.2 to the positive pole of power source V and allowing a pulse to flow through the coil. With switch S still closed, switching components S1, S2, S3, and S4 will open again, preventing any more current from flowing through the coil. When switch S is opened, controls component ST2 will emit control signals from signal-emitting output terminals SA3 and SA4 that briefly close switching components S3 and S4. The input terminal 16.1 of magnetic coil 16 will now be connected to the positive pole and its input terminal 16.2 to the negative pole of power source V, allowing current to flow through the coil in the opposite direction. Circuit Z will simultaneously prevent the voltage at input terminals 16.1 and 16.2 from exceeding a prescribed level, accordingly limiting as well the amplitudes of the closing pulses flowing through the coil. The ratio of output during an opening pulses to that during a closing pulse can accordingly be controlled.

Buffer capacitors C1 and C2 ensure that the controls will continue to function even when switch S is open and no power is being supplied. The circuitry will, as will be evident, ensure by emitting a closing pulse that the valve can be closed even when power source V completely fails.

Since controls component ST1, which monitors the voltage, and controls component ST2, which generates the pulses, can each be of conventional design, their circuitry will not be specified. Obviously, the system can be designed to release an alarm when the power drops below a certain level or fails completely.

What is claimed is:

1. A servo valve comprising: a housing having a fluid intake and a fluid outlet; a differential piston mounted for back and forth movement in the housing; a disk mounted on the piston; means forming a compression chamber in the housing at one end of the piston in communication with the fluid intake; an outlet seat facing the disk for providing communication between the compression chamber and the fluid outlet; means forming an eccentric control bore extending through the piston; means forming a control chamber at the other end of the piston in communication with the fluid outlet through a depressurization channel and with the compression chamber through the control bore; a bistable solenoid valve for controlling the servo valve comprising a coil on the housing, a tube extending through the coil, an armature mounted for back and forth movement in the tube, means forming a solenoid valve chamber at one end of the tube, a solenoid valve seat in the chamber, a gasket mounted on one end of the armature facing the solenoid valve seat, a head accommodated in the tube and facing the other end of the armature, a yoke surrounding the ends of the coil, and wherein the depressurization channel extends through the solenoid valve chamber and solenoid valve seat and is closed off by the gasket; wherein the armature travels freely back and forth in the tube, wherein the coil is responsive to an opening pulse applied thereto to move the armature into a position at the head, wherein the head, the armature, and the yoke are all made of soft-magnetic material having a coercive field strength which is lower than 400 A/m, wherein the coercive field strength of the material of the armature and head is lower than that of the material of the yoke, and wherein the weight of the armature matches the magnetic force retaining the armature in the position at the head, the magnetic force being determined by the coercive field strength of the soft-magnetic material.

2. The servo valve as in claim 1, wherein the weight of the armature matches the magnetic force retaining the armature such that the valve has a longitudinal axis at an angle of up to 30° to the vertical.

3. The servo valve as in claim 1, wherein the head and the armature have an air gap therebetween disposed below the level of a plane halfway up the coil.

4. The servo valve as in claim 3, wherein the plane halfway up the armature is essentially on the same level as an end of the yoke between the coil and the housing.

5. The servo valve as in claim 1, further comprising means for applying control pulses to the coil to alternately effect mutually sequential opening pulses and closing pulses on the part of the magnetic field, whereby the closing pulses have a polarity opposite that, and an amplitude less than that, of the opening pulses.

6. The servo valve as in claim 5, wherein the ratio of the amplitude between the output of the opening pulses and that of the closing pulses is at least between 3:1 and 5:1.

7. The servo valve as in claim 5, wherein the means for applying control pulses emits electric pulses that vary in polarity and amplitude.

8. The servo valve as in claim 5, wherein the means for applying the control pulses includes a source of electric power and an on-and-off switch and means for emitting an opening pulse when the switch is closed including a buffer capacitor which is charged simultaneously with the opening pulse and discharges and generates a closing pulse when the switch is opened.

* * * * *